United States Patent [19]

Berkey et al.

[11] Patent Number: 5,131,735

[45] Date of Patent: Jul. 21, 1992

[54] FIBER OPTIC COUPLER

[75] Inventors: George E. Berkey, Pine City; Michael B. Cain, Corning; Kenneth T. Overman, Painted Post, all of N.Y.

[73] Assignee: Corning Incorporated, Corning, N.Y.

[21] Appl. No.: 670,273

[22] Filed: Mar. 15, 1991

Related U.S. Application Data

[62] Division of Ser. No. 366,658, Jun. 15, 1989, Pat. No. 5,031,300.

[51] Int. Cl.⁵ .......................... G02B 6/26; G02B 6/42
[52] U.S. Cl. ........................................ 385/43; 65/3.11; 385/15
[58] Field of Search ............... 350/96.15, 96.20, 96.21; 65/3.11, 3.2, 4.1, 4.2

[56] References Cited

U.S. PATENT DOCUMENTS

| | | | |
|---|---|---|---|
| 4,798,434 | 1/1989 | Dammann et al. | 350/96.15 X |
| 4,834,481 | 5/1989 | Lawson et al. | 350/96.15 |
| 4,902,323 | 2/1990 | Miller et al. | 350/96.15 X |
| 4,902,324 | 2/1990 | Miller et al. | 350/96.15 X |
| 4,915,467 | 4/1990 | Berkey | 350/96.15 |
| 4,931,076 | 6/1990 | Berkey | 350/96.15 X |
| 4,948,217 | 8/1990 | Keck et al. | 350/96.15 |
| 5,009,692 | 4/1991 | Miller et al. | 350/96.15 X |
| 5,011,251 | 4/1991 | Miller et al. | 350/96.15 |

Primary Examiner—Akm Ullah
Attorney, Agent, or Firm—William J. Simmons, Jr.

[57] ABSTRACT

A fiber optic coupler is formed by providing a glass tube having a longitudinal aperture extending therethrough. Glass optical fibers, each having a core, cladding and coating are disposed within the longitudinal aperture, the fibers extending beyond each end thereof. The coating is removed from that portion of the fibers in the midregion of the tube. The midregion of the tube is heated, collapsed about the fibers, and drawn to reduce the diameter thereof over a predetermined length. The fibers that are used in the process of making the coupler are initially provided with a coating that is too thin to provide good handleability and strength. However, the thin initial coating enables the use of a tube having a small aperture and thereby enhances the tube collapse step. After the coupler is formed, the fibers extending therefrom are overcoated. The process can be used to make other kinds of optical devices including integrated optical components.

7 Claims, 4 Drawing Sheets

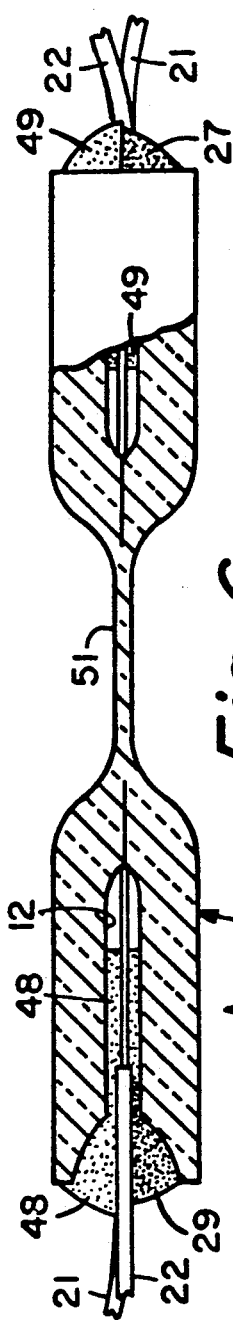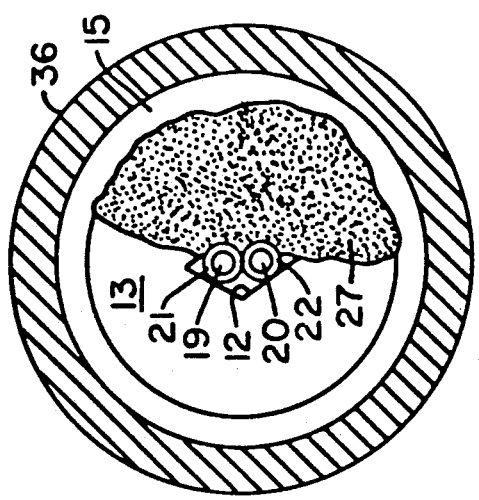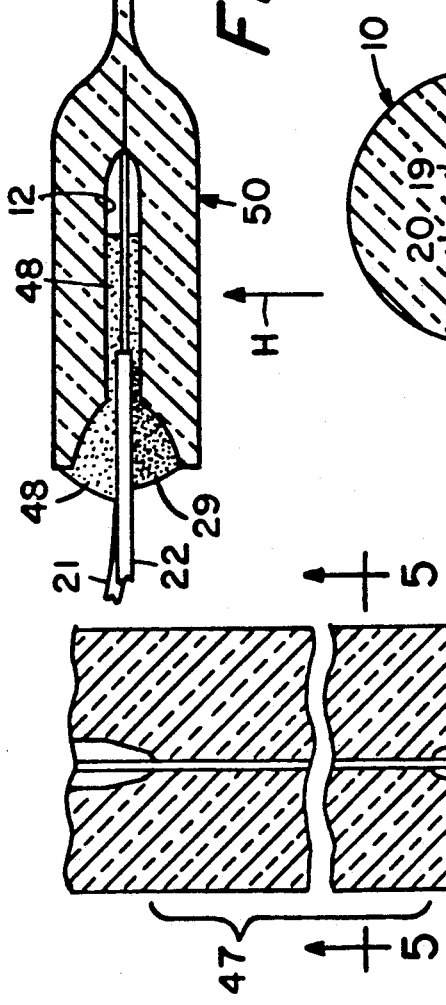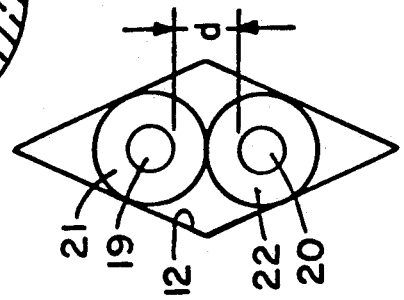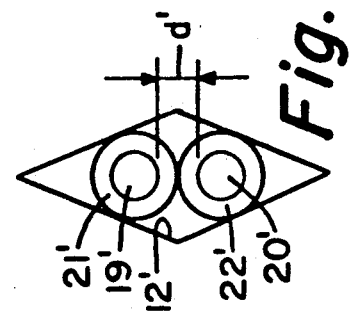

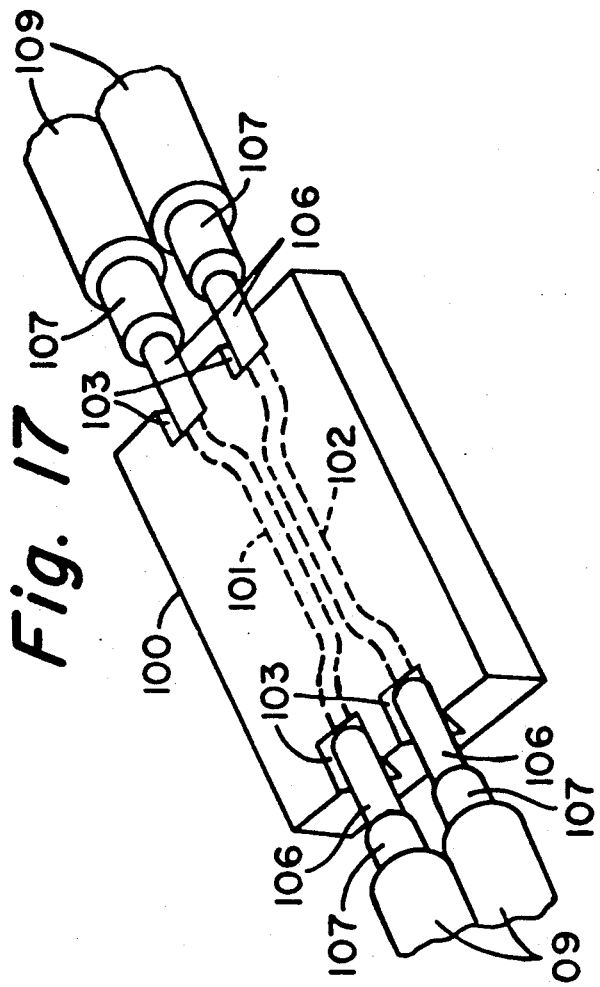
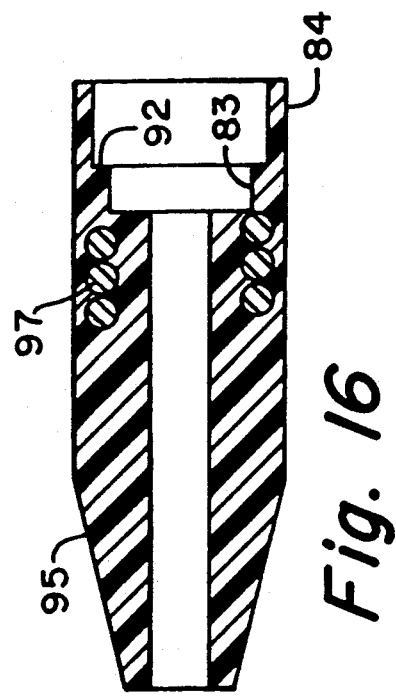
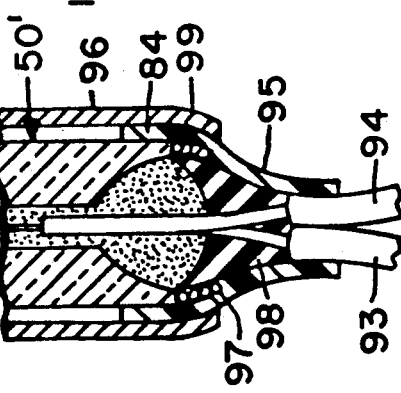
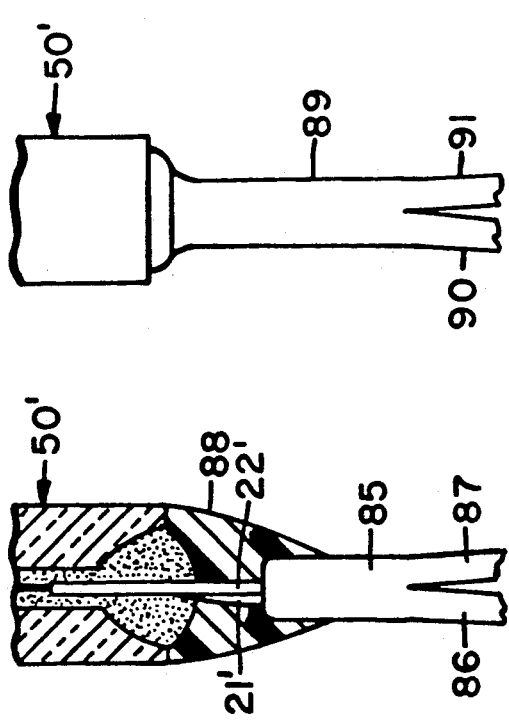
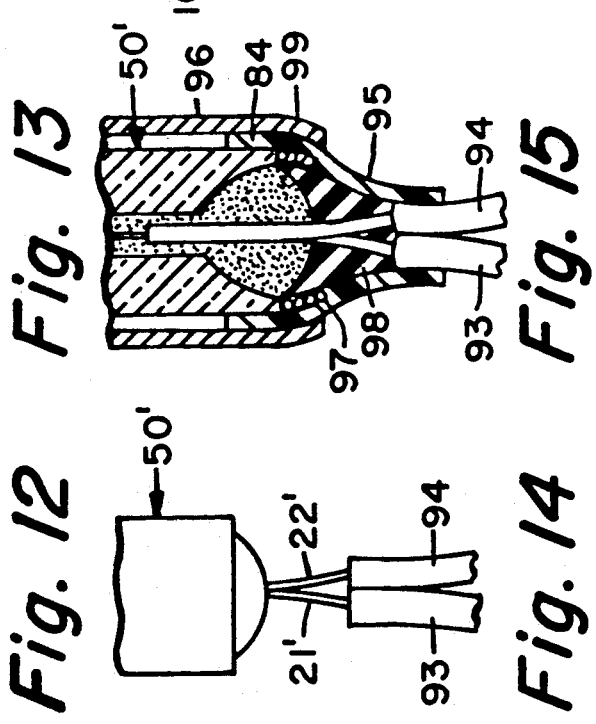

025
FIBER OPTIC COUPLER

This is a division of application Ser. No. 07/366,658, filed June 15, 1989, now U.S. Pat. No. 5,031,300.

Cross-Reference To Related Application

This application is related to the following U.S. patent applications: Ser. No. 204,620 now U.S. Pat. No. 4,931,076 entitled "Method of Making an Economical Fiber Coupler" (G. E. Berkey), filed June 9, 1988; and Ser. No. 223,423 now U.S. Pat. No. 4,902,324 entitled "Method of Reproducibly Making Fiber Optic Coupler" (W. J. Miller et al.) filed July 25, 1988.

BACKGROUND OF THE INVENTION

The present invention relates to a method of making optical devices such as fiber optic components and integrated optical components of the type from which there extend short lengths of optical fibers referred to herein as "pigtails". Such optical devices can perform such functions as coupling, wavelength division multiplexing. filtering and the like. Couplers are discussed herein by way of example in order to provide an understanding of the background of the present invention.

Reproducible methods of making rugged optical fiber couplers are disclosed in published European patent application No. 0302745, published 08 Feb. 89. A plurality of suitably prepared glass fibers, each having a core and cladding, are disposed within the longitudinal aperture of a glass capillary tube. Each fiber extends beyond at least one end of the tube to form a connection pigtail. The pigtails are provided with the same type and diameter of coating as the optical fibers of the system in which the device is intended to be used so that the device can be easily integrated into the system. The midregion of the tube is heated and collapsed about the fibers, and the central portion of the collapsed midregion is stretched to reduce the diameter thereof. The optical fibers used to form the coupler are conventionally provided with a plastic coating to increase the strength and/or the handleability thereof. The preparation of the optical fibers has involved removing the coating from that portion of the fiber which is positioned at the midregion of the tube. The coated portion of a fiber is pulled through the tube aperture in order to position the bared region in the center of the tube prior to the tube collapse step. In one prior art embodiment, the coated portions of each fiber extend into the ends of the tube aperture to hold the fibers in proper alignment while the tube is collapsed thereon. The aperture must therefore be large enough to accept the coated portions of the fibers. If air is trapped adjacent the fibers or if glass flows between the fibers during the tube collapse step, optical characteristics such as attenuation and coupling ratio are adversely affected. These adverse effects are more likely to occur when the aperture diameter is relatively large, whereby the tube must undergo an inordinate amount of collapse prior to the time that it engages the fibers therein.

Another optical device to which the present invention pertains is the integrated optical component, which comprises optical waveguide paths on or in the surface of a substrate. Such devices can function as signal splitters, single-mode proximity couplers, single-mode coupler/multiplexers and the like. Such devices may be provided with optical fiber pigtails which enable the connection of the device to another optical fiber. The optical fiber pigtails may be affixed to an integrated component by inserting the end of a fiber into a groove, cavity or the like, which is situated on the substrate, with the fiber core in alignment with an optical path, and gluing the fiber in place. The pigtails preferably comprise the same type of conventional coated optical fiber to which the device is intended to be connected. Some conventional fibers are provided with a relatively thick coating. A short portion of the coating is removed from the end of the optical fiber prior to attaching it to the integrated circuit. The density of optical paths that may exist at the edge of a circuit may be so great that there is insufficient space for the conventionally coated optical fiber pigtails to exist in a side-by-side array and yet have the fiber ends align with their respective optical paths. When conventional fibers having relatively thick coatings have been employed, the density of connections to the device has therefore been made small enough to accommodate such coatings.

SUMMARY OF THE INVENTION

It is an object of the present invention to provide a method that overcomes the disadvantages of the prior art. Another object is to provide an improved method of making fiber optic devices, the characteristics of which are enhanced when thinly coated fibers are employed during the manufacture thereof. A further object is to provide a method of making optical couplers, the optical properties of which closely conform to predetermined values.

One aspect of the invention concerns a method of making an optical device having at least one optical fiber extending therefrom. The method is of the type wherein at least that portion of the fiber that extends from the device has a primary coating the thickness of which is less than that needed for compatibility in a particular fiber optic system. The improvement of the present invention comprises applying liquid coating material to that portion of the fiber that is adjacent the device, and continuing to apply the coating material along the length of the fiber, and curing the coating material.

The step of applying may comprise inserting the fiber into a coater such that the coater is immediately adjacent the device, applying coating material to the coater, and moving the device with respect to the coater to increase the distance therebetween. The coater may comprise a chamber into which coating material is fed, the chamber having first and second opposed walls through which a sizing bore and a guide bore extend, respectively. The step of inserting may comprise inserting the fiber into the sizing bore, through the chamber and through the guide bore; the step of moving results in the withdrawal of the fiber from the sizing bore. During the withdrawal of the fiber from the sizing bore, the fiber is preferably frictionally engaged at that end thereof adjacent the guide bore to improve coating concentricity.

If the device comprises a plurality of fibers, the step of applying may comprise simultaneously applying coating to the plurality of fibers or consecutively applying a coating to each of the plurality of fibers.

Coating material can be applied to the fiber in such a manner that it contacts the device, or it can be applied in such a manner that it fails to cover a short length of the fiber adjacent the device. In the latter embodiment, a boot of resilient material can be applied to that portion of the device adjacent the fiber, the boot extending onto the coated portion of the fiber. The boot may comprise a tapered sleeve of resilient material, in which case it can be attached by threading the fiber therethrough and attaching the large end thereof to that portion of the device adjacent the fiber. The tapered resilient sleeve may contain means for rigidifying the large end thereof, and it can be attached to the device by threading the fiber therethrough until the large end thereof lies adjacent the device. A protective sleeve can be positioned over the device and crimped onto that portion of the boot containing the rigidifying means. The fiber can be provided with additional bending protection by filling the tapered sleeve with resilient material. In an embodiment wherein the boot comprises a tapered sleeve of resilient material having a thin-walled region at the large end thereof, the step of applying the boot comprises threading the fiber through the boot until the thin-walled region of the boot lies over the end of the device. A protective sleeve is positioned over the device and attached to the boot.

A specific embodiment of the invention relates to the following method of making a fiber optic coupler: (a) a plurality of coated optical fibers is inserted into the bore of a glass tube, at least that portion of each fiber that is located in the tube midregion having no coating thereon, (b) the tube midregion is collapsed onto the fibers, and (c) the central portion of the midregion is stretched. The method is of the type wherein the coated portion of at least one of the fibers is pulled through the tube bore to position the bared region of the fiber in the bore. In accordance with the present invention, the improvement comprises initially providing the fiber with a primary coating, the thickness of which is insufficient to provide it with adequate strength during use. By employing such thinly coated fiber, the diameter of the tube bore can be made relatively small, thereby enhancing the step of collapsing the tube. After the step of stretching, the fiber is provided with at least one additional layer of coating material.

The method of the invention is especially suitable for use in the fabrication of a discrete single-mode optical device having a plurality of optical fiber pigtails for connecting the device to an optical system having single-mode optical fibers, each having a predetermined diameter and having a coating of predetermined thickness. The device is initially formed with preliminary optical fiber pigtails extending therefrom, the preliminary pigtails comprising single-mode optical fibers having the predetermined diameter and having coatings, the thicknesses of which are sufficient to permit temporary handling but which are thinner than the predetermined thickness. Thereafter, an additional thickness of coating material id added to the pigtails. The composite of the thickness of the coating of the preliminary pigtails and the additional thickness equals the predetermined thickness.

The present invention is also directed to an optical fiber coupler comprising an elongated glass body having a solid midregion and first and second opposite end portions which respectively extend from the midregion to the first and second ends of the body. The central portion of the midregion has a diameter smaller than the diameter of the remainder of the glass body. First and second longitudinal apertures respectively extend from the first and second ends of the body to the midregion thereof. At least two glass glass optical fibers, each having a core and cladding, extend through the body and beyond at least the first end thereof. The cores of the optical fibers are clpser together in the central portion of the midregion than in the remainder of the glass body so that optical signals can be coupled from one of the cores to another of the cores. A preliminary coating of ultraviolet light curable coating material is disposed on the surface of those portions of the two glass optical fibers that extend from the first end, and an overcoat of heat curable coating material applied over the preliminary coating.

In one embodiment, the preliminary coating extends into the first longitudinal aperture, and the overcoat does not extend into the longitudinal aperture. The space between the aperture and the preliminary coating can filled with bonding material. The overcoat can be applied such that it contacts the bonding material. If the overcoat is separated from the bonding material, the coupler can further comprise boot means between the first end of the body and the overcoat. The boot means can comprise a tapered sleeve of resilient material, the coupler further comprising means securing the boot to the coupler. The boot can include rigidifying means at the large diameter end thereof, in which case the coupler further comprises a protective sleeve surrounding the glass body. An end of the protective sleeve is bent inwardly and engages that portion of the boot having the rigidifying means.

BRIEF DESCRIPTION OF THE DRAWINGS

FIG. 2 is a cross-sectional view taken along lines 2-2 of FIG. 1.

FIG 4 is a cross-sectional view illustrating the collapse of the glass tube around the fibers to form a solid midregion.

FIG. 5 is a cross-sectional view through the solid midregion of FIG. 4 along lines 5—5.

FIG. 6 is a cross-sectional illustration of the fiber coupler of the present invention after it has been drawn down and sealed at its ends.

FIGS. 7 and 8 are schematic illustrations of aperture cross-sections having coated fibers disposed therein.

FIGS. 12-15 illustrate various coupler-pigtail transitions, FIG. 15 being shown in cross-section.

FIG. 16 is an enlarged cross-sectional view of the boot of FIG. 15.

FIG. 17 is an oblique view of an integrated optical component the pigtails of which have been overcoated.

DESCRIPTION OF THE PREFERRED EMBODIMENTS

The drawings are not intended to indicate scale or relative proportions of the elements shown therein.

Figure 1:
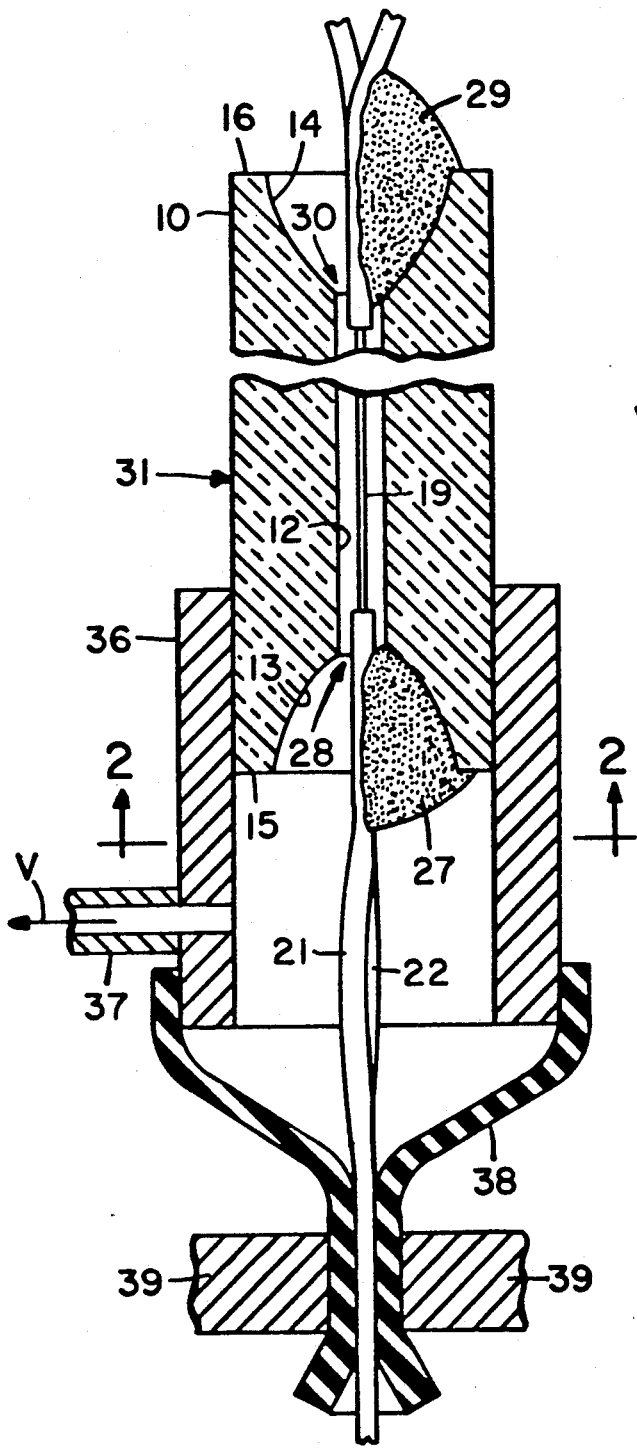
FIG. 1 is a cross-sectional view of a capillary tube after optical fibers have been inserted therein.

A first embodiment pertains to an improved method of making fiber optic couplers. This method employs a tube 10 (FIGS. 1, 2) having a longitudinal aperture 12. Tapered apertures 13 and 14 form funnel-like entrances to aperture 12 at end surfaces 15 and 16, respectively. The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. A preferred composition is borosilicate glass comprising $SiO_2$ doped with 8-10 wt. % $B_2O_3$. Tube 10 can be formed by depositing glass particles on a cylindrical mandrel to form a porous, cylindrically-shaped preform. The mandrel is removed, and the porous preform is dried and consolidated to form a tubular glass body which is heated and redrawn to reduce its diameter. Apertures of non-circular cross-section can be formed in the tube in accordance with the teachings of U.S. Pat. No. 4,750,926, which is incorporated herein by reference. The method disclosed in that patent teaches shrinking the tube onto a carbon mandrel of desired cross-section and then burning out the mandrel. A short section of tube having tapered apertures 13 and 14 can be formed by attaching a capillary tube to a source of air pressure, and while rotating the tube, directing a flame onto the tube at spaced intervals. The air pressure within the tube causes a bubble to be formed at each region of the tube softened by the flame. The tube is scored at the center of each bubble and then severed at each score line to produce a capillary tube having tapered apertures at each end.

In the manufacture of certain types of coupling devices, such as WDM couplers and polarization retaining couplers, the fibers must be kept untwisted and must be maintained parallel to one another. The occurrence of slack in one or both of the fibers during the tube collapse step could cause the resultant device to exhibit an excessive loss and/or could cause variations in the coupling ratio. However, these requirements do not exist for all types of couplers. Indeed, certain fiber optic couplers employ twisted fibers.

Two lengths 19 and 20 of optical fiber are severed from a reel of fiber. Fibers 19 and 20 generally comprise a core and cladding and are provided with protective coatings 21 and 22, respectively. Each fiber that extends from the device should be sufficiently long to enable the connection of another fiber thereto. In the present embodiment wherein each fiber extends from both ends of the coupler, a total fiber length of 2 meters was found to be sufficient. A portion of the coating intermediate the ends of each fiber is removed for a distance slightly shorter than the length of aperture 12. The fibers are wiped to eliminate residual material. A small amount of ethyl alcohol may be squirted into the tube to temporarily lubricate the fibers during insertion thereof; it then readily evaporates. The uncoated portions of the fibers are disposed intermediate end surfaces 15 and 16 of tube 10, they are preferably centered within aperture 12.

The proper alignment of the fibers in the tube can be facilitated by employing the optimal aperture cross-sectional shape, which depends on the number of fibers employed. For example, proper orientation of fibers 19 and 20 is facilitated by employing a diamond-shaped aperture, since there is insufficient space available in such an aperture for the coated fibers to be disposed in any orientation except that which is illustrated in FIG. 2. Similar apertures, including those having the cross-sectional shape of a regular polygon can be used for more than two fibers.

A small amount 27 of glue is applied to one side of fibers 19 and 20 to attach them to one side of tapered aperture 13 while leaving an opening 28 which permits access to aperture 12 between glue 27 and the remainder of the tapered aperture 13. A drop 29 of glue is similarly applied between the fibers and tapered aperture 14, leaving aperture access opening 30. While glue 29 is setting or curing, a slight tension is applied to fibers 19 and 20 to ensure that the fibers extend linearly through the aperture. If the glue is a UV light curable epoxy, UV light is directed on the first applied drop of epoxy to cure it before the second drop is applied to the remaining end. After the second drop is applied, it is cured by UV light.

Figure 3:
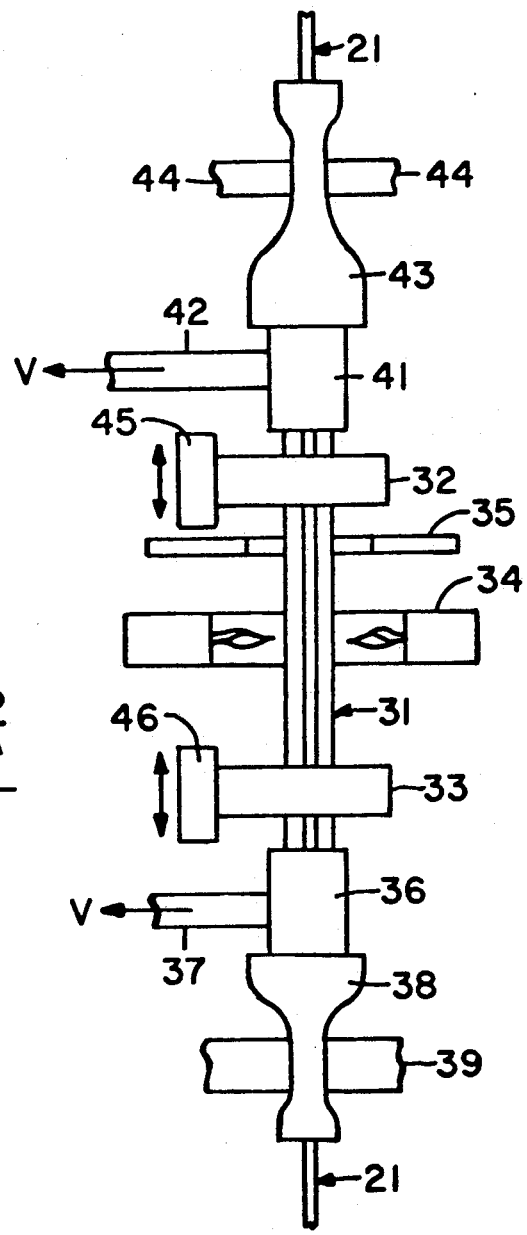
FIG. 3 is a schematic illustration of an apparatus for collapsing the tube and drawing the midregion thereof.

Apparatus for collapsing and stretching the resultant preform 31 is shown in FIG. 3. Chucks 32 and 33, which secure preform 31 in this apparatus, are mounted on motor controlled stages 45 and 46, respectively, which are preferably controlled by a computer. Heat shield 35 protects the apparatus located above ring burner 34. Preform 31 is inserted through ring burner 34, is clamped to the draw chucks, and vacuum attachments 36 and 41 are attached to the ends thereof. Vacuum attachment 36, which is shown in cross-section in FIG. 1, may comprise a short, somewhat rigid section of rubber tube having a vacuum line 37 extending radially therefrom. One end of a length of thin rubber tubing 38 is attached to that end of vacuum attachment 36 that is opposite preform 31; the remaining end of the tubing extends between clamp jaws 39. Upper vacuum attachment 41 is similarly associated with line 42, tubing 43 and clamp jaws 44. The coated portions of the fibers extend from tubing 38 and 43.

Vacuum is applied to the lower portion of coupler preform 31 by clamping jaws 39 on tubing 38 while the upper line is vented to air by leaving clamp jaws 44 open. This "air wash" pulls from aperture 12 any loose debris which has accumulated therein during the fiber insertion step. Jaws 44 are then clamped against tubing 43 to apply vacuum to the upper portion of preform 31.

The flame from ring burner 34 heats tube 10 for a short period of time, typically about 25 seconds, to increase the temperature of midregion 47 of the tube to the softening temperature thereof. With the assistance of the differential pressure on the tube, the matrix glass collapses onto the fibers 19 and 20 and urges them into mutual contact. The tube matrix glass surrounds the fibers and fills the aperture to form a solid structure as shown in FIGS. 4 and 5. The portion described as midregion 47, which forms the coupling region of the resultant coupler, becomes a solid region wherein substantially the entire lengths of fibers 19 and 20 are in mutual contact. The longitudinal length of the collapsed region depends upon the temperature and time duration of the flame, the thermal conductivity of the glass tube, and the amount of vacuum applied.

After the tube cools, the flame is reignited, and the center of the collapsed region is reheated to the softening point of the materials thereof. The flame duration for the stretch process, which depends upon the desired coupler characteristics, is usually between 10 and 20 seconds. The shorter heating period for the stretch step results in a stretched region that is shorter than the collapsed region. Stretching only the central portion of the collapsed midregion ensures that the coupling region of the fibers will be embedded in the matrix glass of the capillary tube. During this reheating step, the fibers are also heated since they are completely surrounded by the matrix glass of the capillary tube and are therefore in thermal contact therewith. After the collapsed tube is reheated, the flame is extinguished and stages 45 and 46 pull in opposite directions until the coupler length has been increased by a predetermined amount to bring the fiber cores closer together along a distance sufficient to accomplish a predetermined type of coupling. The diameter of midregion 47 is reduced as illustrated by region 51 of FIG. 6. The diameter of drawn down region 51 depends upon various fiber and operational parameters. The ratio of the drawn down diameter of region 51 to the starting diameter of midregion 47 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

The amount of stretching to which the coupler preform must be subjected to achieve a given type of coupler is initially determined by injecting light energy into one input fiber of a coupler preform and monitoring the output power at the output fibers during the stretch operation. The predetermined ratio of the dynamic output powers from the two fibers can be used as an interrupt to cause stages 45 and 46 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. Patent Application No. GB 2,183,866 A and International Publication No. WO 84/04822. Furthermore, computers are often employed to in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the stages pull and stretch the coupler preform.

The vacuum lines are removed from the resultant coupler, and quantities 48 and 49 of glue are applied to the ends of the capillary tube (FIG. 6). Heat (arrow H) is applied locally to the uncollapsed regions of the coupler to drive air from the aperture. The heat source is removed, and glue is drawn into the aperture and then cured. Glue 48 and 49 increases the pull strength of the fiber pigtails and produces a hermetic seal. The resultant fiber optic coupler 50 of FIG. 6 functions to couple a signal propagating in one optical fiber to the other and vice versa. The coupler is then removed from the draw apparatus and can be packaged if additional stiffness is desired.

Various modifications can be made to the above-described embodiment. In certain embodiments, the fibers need not be glued to the ends of the tube, and/or the fibers can be twisted. Midregion 47 could be heated by means of a conventional single-flame burner during the tube collapse and stretch steps, in which case the tube should be rotated with respect to the flame to provide uniform heating. The burner may traverse midregion 47 during the tube collapse step and/or the stretch step, but it is preferred that it remain stationary with respect to the tube during these operations. During the tube collapse step, the vacuum source could be attached to only one tube end, in which case a traversing burner should traverse the tube toward the evacuated end of the tube. During the step of drawing the preform midregion, stage 45 could be moved at a different velocity than stage 46 and in the same direction as stage 46. Furthermore, tube 10 can be disposed in any orientation including vertical and horizontal during the tube collapse and/or drawing operations.

If the collapse and stretch operations are performed in the same apparatus, it is preferred that tube 10 be allowed to cool prior to being reheated for the stretch step. This temporal separation of the two steps results in better process control and therefore better reproducibility. Couplers can also be made by an alternative embodiment wherein the steps of collapsing the tube onto the fibers and drawing or stretching the midregion of the tube are performed in a single heating operation. However, this modified embodiment can result in a reduction in hermeticity, and it can adversely affect manufacturing reproducibility.

The above-described embodiment is a known method of making optical fiber connectors and is described in greater detail in European patent application No. 0302745, published 08 Feb. 89. In accordance with that known method, the coated fibers to be used in the coupler fabrication process are chosen solely on the basis of compatibility with the optical fibers employed in the system in which the coupler is intended to be used. For example, 125 μm diameter single-mode fibers having a coating diameter of 250 μm would be used in the fabrication of a coupler that is to be connected to 125 μm single-mode fibers having a coating diameter of 250 μm. Furthermore, the coating material of the coupler fibers and the system fibers is preferably the same. In that known method, the size of the tube aperture has been dictated by the diameter of the coating of the system fiber. If the aperture cross-section must be made large in order to accommodate a relatively thick fiber coating, the step of collapsing the tube onto the fibers may occur with less than optimal results, i.e. bubbles may form adjacent the fibers, or glass from the tube wall may enter the region between the fibers. The median excess device loss is therefore reduced, and process repeatability is enhanced.

It is now thought that, as a primary consideration, the aperture diameter should be as small as possible, such diameter being determined by the thinnest coating with which the fibers can be provided without adversely affecting fiber handleability during the coupler manufacturing process and without adversely affecting fiber strength in the resulting coupler. This criteria is based on the following theory concerning the collapse of the tube onto the fibers. Following is the sequence of events that is believed to occur during the collapse step, reference being made to the schematic illustration in FIG. 7. When coatings 21 and 22 fit snugly into aperture 12, glass optical fibers 19 and 20 are separated by a distance d. As the aperture cross-sectional dimensions decrease in size during the tube collapse step, the flattened wall surfaces of the aperture eventually come into contact with the fibers. Further shrinking of the aperture urges the fibers toward each other until mutual contact is achieved. The glass should flow around the fibers but not between them, thereby causing the fibers to remain in mutual contact along the predetermined length of the collapse region. The fibers should also be maintained substantially linearly in the coupling region to thereby improve coupler characteristics, especially in single-mode couplers. For example, core linearity in the coupling region enables a coupler to retain the polarization of a single-mode signal.

In accordance with the present invention, the tube collapse step is enhanced by initially employing a fiber coating that is relatively thin and by employing a capillary tube having an aperture of correspondingly reduced cross-sectional dimensions. Reference is now made to FIG. 8 wherein elements similar to those of FIG. 7 are represented by primed reference numerals. Optical fibers 19' and 20' have the same diameter as optical fibers 19 and 20 of FIG. 7. However, coatings 21' and 22' are thinner than coatings 21 and 22, thereby permitting aperture 12' to be smaller in cross-section than aperture 12. When coatings 21' and 22' are positioned in the illustrated manner in the ends of aperture 12', fibers 19' and 20' are separated by only a distance d' throughout the remainder of the aperture. Since the walls of aperture 12' undergo less inward movement before total collapse is achieved, and since fibers 19' and 20' must be moved a shorter distance to achieve mutual contact, the tube collapse step is more likely to be accomplished without matrix glass from the tube flowing between the fibers and without the deviation of the fibers from a linear path. Furthermore, because of the enhanced tube collapse step, the collapsed tube midregion is more likely to be free from air lines, bubbles, or the like.

The minimum thickness of coatings 21' and 22', which depends upon the coating material, must be sufficient to provide fibers 19' and 20' with adequate strength and handleability. Thin coatings are more difficult to strip from optical fibers. Therefore, the initial thin coating with which the fibers are provided should be easily strippable. Coating materials which possess this characteristic are ultra violet light curable urethane acrylates, ultra violet light curable silicones, thermally curable curable silicones and the like. When urethane acrylate coating material is employed, it is conventional practice to apply two coatings, the second of which has a higher modulus than the first.

After the coupler is made, additional coating material, referred to herein as "overcoating", is added to each pigtail extending therefrom to form a coated fiber that is compatible with the system fibers with which the coupler is to be connected. Although the overcoating may be applied in a plurality of layers, a single coating application has been found to be acceptable.

Figure 10:
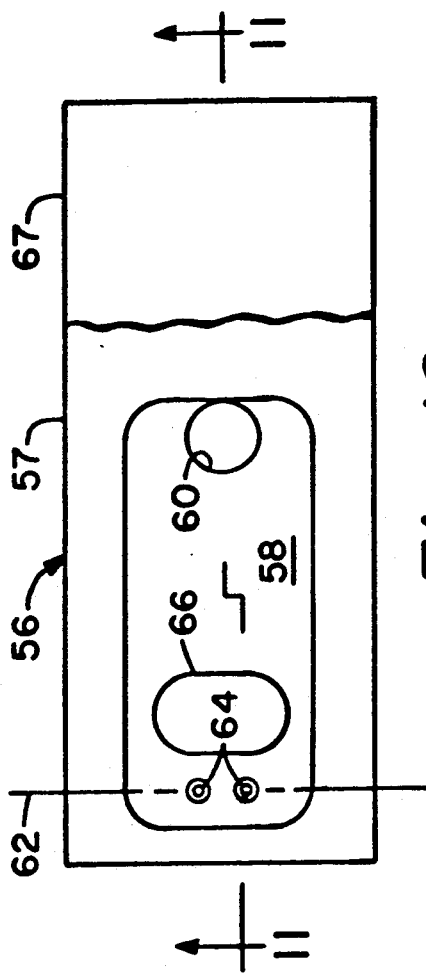
FIG. 10 is a top view of a coater, the cover being partially removed.
Figure 11:
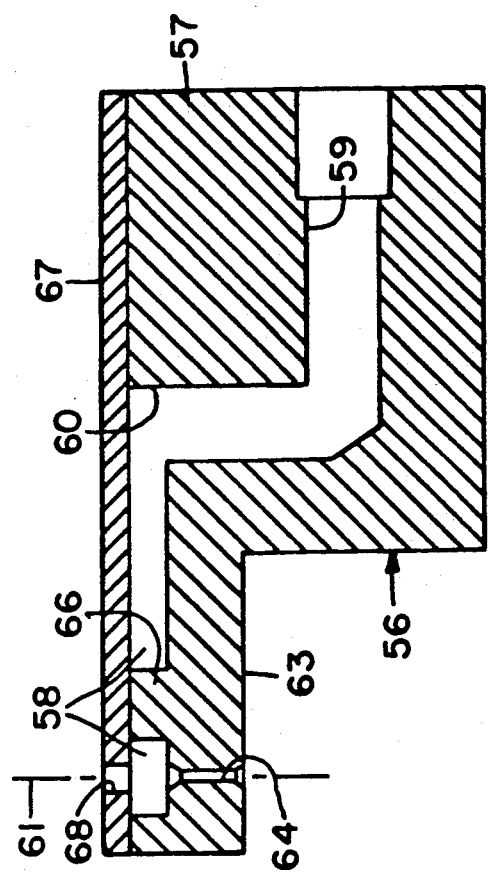
FIG. 11 is a cross-sectional view taken along lines 11—11 of FIG. 10.
Figure 9:
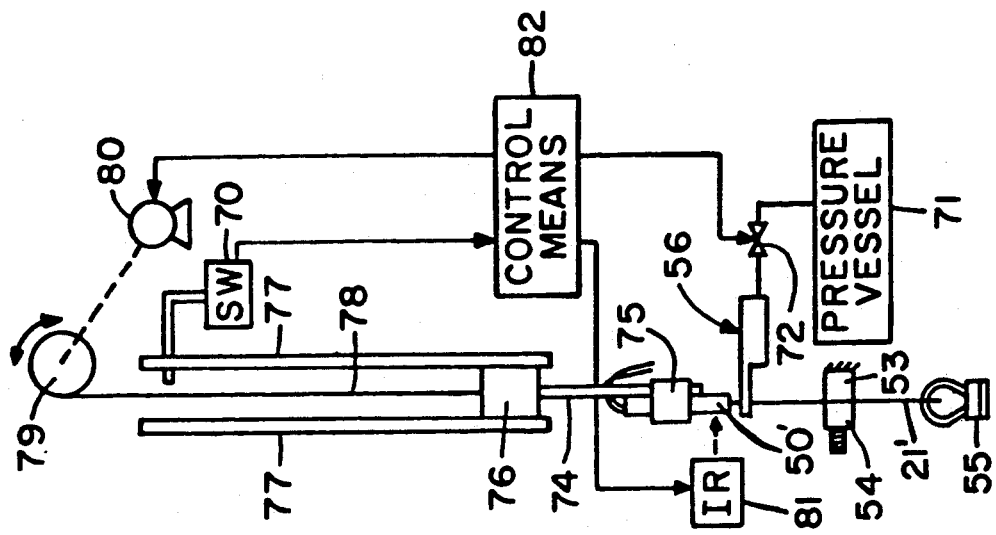
FIG. 9 is a schematic illustration of an apparatus for overcoating optical fiber pigtails.

Apparatus for applying a layer of coating material to the coupler pigtails is illustrated in FIGS. 9-11. Coater 56 comprises a housing 57 having a cavity 58 in the upper surface thereof. Cavity 58 is connected to a feed port 59 by bore 60. Two bores 64, which are enlarged at both ends thereof, extend through thin housing protrusion 63 and terminate at that portion of cavity 58 opposite bore 60. A flow divider 66 is located within cavity 58 between bore 60 and bores 64. Cover plate 67, which is secured to housing 57, contains two bores 68 which are axially aligned with bores 64.

The coater could be modified in accordance with the teachings of U.S. Pat. No. 4,688,515 to facilitate the pigtail insertion step. Coater 56 could be split into two sections along the plane passing through the two sets of bores. The separation plane is represented by broken lines 61 and 62 of FIGS. 10 and 11, respectively. Means such as guide pins and holes can be employed to align the two halves after a pigtail has been inserted therein.

Referring to FIG. 9, coater 56 is connected to pressure vessel 71 by a flow control valve 72. A coupler 50 is attached to support arm 74 by attachment means 75. Arm 74 is attached to the bottom of weight 76 which slides vertically in guide rails 77. Cable 78 is wound upon a drum 79 that is rotated by motor 80. As indicated by the dashed-line arrow, source 81 directs infrared energy immediately above coater 56. Control means 82 provides electrical signals to energize valve 72, motor 80 and source 81.

If the coater had not previously been filled with coating material, valve 72 is opened to flow coating material into the coater and purge air therefrom prior to threading the pigtails. Valve 72 is then closed for the pigtail insertion process. To coat the pigtails of an optical fiber coupler 50 of the type shown in FIG. 6, one of the pigtails can be inserted through each of the aligned pairs of bores 68 and 64, the conically-shaped entrance to the top of bore 64 facilitating fiber insertion. The coupler body is then affixed to arm 74. A weight 55 is clamped onto the ends of the pigtails, and a spring-biased friction block 54 is retracted away from fixed friction block 53. The pigtails are moved into position against block 53, the surface of which lies in a vertical plane in which the axes of bores 64 and 68 lie. Block 53 may contain a mark that is located vertically below a point midway between the coater bores. If only one set of bores were employed, the mark would be located on their axis. After the pigtails are aligned with the mark on block 53, motor 80 is energized to unwind cable 78 from drum 79, and the coupler body is lowered until the end thereof is about 0.5 cm above coater 56. Block 54 is released, whereby it is biased into contact with the pigtails. Weight 55 is then removed. Blocks 53 and 54 can be coated with velvet, felt or the like to permit the pigtails to move smoothly therebetween. Friction blocks 53 and 54 prevent vibration of the pigtails above the coater and align the primary coated pigtails with respect to sizing bores 68.

Source 81 can be turned on prior to initiating the coating process to permit it to achieve maximum heat output. To avoid undue heating of the coating apparatus during the warm-up period, source 81 can be directed away from that apparatus. When the coating operation is about to begin, source 81 is brought into operating position, but the coating apparatus is initially shielded from its output.

To initiate the coating process, the shield is removed from source 81, and control means 82 initially energizes valve 72, energization of motor 80 occurring immediately thereafter. A delay of about 0.5 second between energization of valve 72 and motor 80 was a sufficient period to enable the valve to open after it had been energized. Cable 78 is wound upon drum 79, thereby pulling apparatus 74, 76 upwardly. The resultant upward movement of coupler 50 pulls the pigtails upwardly through the coater as coating material is supplied thereto through valve 72. It has been found that a suitable coating material is a thermoplastic resin that is sufficiently thixotropic that it retains its shape and diameter until cured by the infrared energy from source 81. Thermally curable silicones should also be useful. Although it is thought that some ultraviolet light curable materials could be employed, such materials would require much additional specialized coating equipment. The diameter of bores 64 is only slightly larger than the initial coating diameters of pigtails 21 and 22. These bores therefore, along with the friction blocks, function to center the pigtails within bores 68, thus enhancing coating concentricity. The diameter of the resultant overcoating is determined by such parameters as the diameter of bore 68, the type of coating material employed, the temperature of the coating material and the rate of upward movement of the coupler.

After the pigtails pass through friction blocks 53 and 54, the portions thereof below the coater are free to move laterally, and the portions thereof above the coater may experience vibration. Either of these effects can adversely affect coating concentricity. Therefore, the upward movement of coupler 50′ preferably stops prior to the time that the ends of the pigtails leave blocks 53 and 54, whereby a short section at the end of the pigtails does not receive an overcoating. If cessation of the process is to be automatic, a switch 70 can be mounted near the top of guides 77. When actuated by weight 76, switch 70 provides an input signal to control means 82 to de-energize valve 72 and motor 80. Valve 72 begins closing a short time prior to de-energization of motor 80 to provide valve 72 with sufficient time to close before the upward movement of the coupler stops. Control means 82 could de-energize source 81, or that source could be directed away from the coating apparatus until the pigtails of the next optical device are loaded into the coater.

FIGS. 12-15 illustrate various kinds of pigtail-coupler junctions that can be formed in accordance with the present invention. Elements of these figures that are similar to elements of FIG. 6 are represented by primed reference numerals.

When both pigtails 21′ and 22′ are simultaneously coated, the initially applied coating material conventionally runs together to form a unitary coating 85 which may extend about 5 cm from coupler 50. Thereafter, original pigtails 21′ and 22′ become independently coated with separate overcoatings 86 and 87, respectively. When valve 72 is opened immediately prior to initiation of the upward movement of coupler 50, primary coated pigtails 21′ and 22′ remain uncoated for a length of about 0.5 cm. A boot 88 of resilient material can be applied to this short length of primary coated pigtails by painting, molding or the like.

Overcoating material can be caused to attach directly to the end of coupler 50′ by opening valve 72 for a sufficient period of time prior to the commencement of movement of the pigtails through the coater. The resultant excess of coating material in coater 56 begins to emanate from the gap between bores 68 and the primary coated fibers 21′ and 22′. After the coating material contacts the bottom of coupler 50′, motor 80 is energized to initiate the upward movement of the coupler. Initially formed unitary coating region 89 joins overcoated pigtails 90 and 91 to the end of the body of coupler 50′. This technique may be disadvantageous in that the mass of coating material that initially accumulates at the end of the coupler may slump and form a relatively thinly coated region followed by a more thickly coated region if the coating mass cannot be cured quickly enough.

The overcoating can be separately applied to each primary coated pigtail as shown in FIG. 14. This can be accomplished by employing a coater having a single set of guide and sizing bores. One of the primary coated pigtails 21′ can be bent back over the coupler and taped thereto, or it could merely hang over the end of the coater. The remaining pigtail 22′ is then threaded through the coater and thereafter drawn upwardly and provided with an overcoating 93 as described above. Since the first overcoat is cured prior to the time that the second overcoat 94 is applied, the two overcoats remain distinct.

After the pigtails at both ends of the coupler have been overcoated, a sleeve-type boot 95 can be applied to each coupler-pigtail junction. Referring to FIG. 15, overcoated pigtails 93, 94 are threaded through tapered boot 95, the small diameter end of which is just large enough to receive the pigtails. The lack of overcoating material on the end regions of the pigtails facilitates the process of inserting the coated pigtails into the boot. The large diameter end of the boot is then moved into contact with an end of coupler 50′.

Boot 95 is shown in greater detail in FIG. 16. Near that end of the boot that contacts the coupler is a thin wire helical coil 97 that provides rigidity. The mold employed to form boot 95 contains a protrusion on which spring 97 lies during the molding process. The mold protrusion forms in the boot a step 83 of enlarged inner diameter. During the molding process, spring 97 rests on the mold protrusion and is therefore spaced from surface 92 which is adapted to contact the end of coupler 50′. The spring is spaced from surface 92 to prevent the spring from contacting the glass coupler. The boot also contains a very thin wall 84 at the end thereof which is pulled over the end of the coupler.

After the boots have been affixed to both ends of the coupler, it can be inserted into a stainless steel sleeve 96 to provide it with additional stiffness and protection. Sleeve 96, which is slightly longer than the coupler, is secured to the coupler by crimping, bonding or the like. If sleeve 96 is to be secured by crimping, coil 97 provides resistance to crimped end 99 of the sleeve. The sleeve thus tightly grips the boot. Thin wall 84 isolates coupler 50′ from sleeve 96 and helps to secure the boot to the device. The boot can optionally be filled with a resilient potting material such as silicone 98 to provide the pigtails with improved bending resistance.

The process described above in conjunction with FIG. 1-6 was used to make optical fiber couplers. The capillary tube, which was formed of a borosilicate glass containing approximately 8 wt % $B_2O_3$, had an outside diameter of about 2.8 mm and a length of about 4.12 cm. The longitudinal aperture was diamond-shaped, each side of the diamond having a length of about 310 $\mu$m. Each end of the aperture was provided with a tapered aperture.

Two 2 m lengths of optical fiber were employed. The fiber was 125 $\mu$m single-mode optical fiber that was coated with two layers of UV cured urethane acrylate coating material, the second of which had a higher modulus. The diameter of the first applied, low modulus coating was 145 $\mu$m, and the diameter of the second coating was 170 $\mu$m. A section of coating about 3.2 cm long was removed from the central portion of each fiber. The fibers were wiped with a cloth dampened with ethyl alcohol. A small amount of ethyl alcohol was squirted into the capillary tube and the fibers were then threaded onto the tube until the bared section was centered in the aperture. The minimum cross-sectional dimension of the diamond-shaped aperture was just large enough to accept the coated portions of the optical fibers in the manner illustrated in FIG. 8. The length of the stripped section of fiber was slightly shorter than the length of the aperture. The fibers were tacked to the ends of the tube, and the tube was collapsed and stretched as described above. Glue 27, 29, 48 and 49 was comprised of Dymax 911 UV curable adhesive.

The relevant dimensions of coater 56 are as follows. Cavity 58 had a height of 0.06 in. (1.6 mm) and a width of 0.31 in. (8 mm . Flow divider 66 was spaced 0.06 in. (1.6 mm) from the cavity side walls and 0.125 in (3.2 mm) from the cavity end wall adjacent bores 64. The centers of bores 64 were located midway between the flow divider and the cavity end wall, and the distance between those centers was 0.07 in. (1.8 mm). The axial lengths of bores 64 and 68 were 0.06 in. (1.6 mm) and 0.025 in. (0.064 mm), respectively. The diameter of each bore 64 was 0.0075 in. (190 μm), and each was provided with a beveled end, the maximum diameter of which was 0.035 in. (0.9 mm). The diameter of each bore 68 was 0.037 in. (0.95 mm). In order to coat only one fiber at a time, one of the sets of bores was blocked.

A polyvinyl chloride plastisol coating material having a viscosity of 2000 centipoise was stored in vessel 71 at a pressure of about 8 psi at room temperature. Valve 72 was opened for a sufficient time period to purge air from the system; it was closed after coating material flowed from bore 68.

One coupler pigtail was bent back along the coupler body and was taped thereto. The end of the remaining pigtail was inserted through bores 68 and 64, and the coupler was taped to support 74. A few gram weight was clamped to the end of the pigtail. Spring loaded friction block 54 was retracted and the pigtail was aligned with a mark on fixed friction block 53, which was located directly below bore 64. The motor was energized to lower the coupler to within 0.1 in. (0.25 cm) from the top of the coater. The pigtail weight was then unclamped. With its output directed away from the coating apparatus, infrared source 81 was preheated. It was then directed toward that region of the apparatus immediately above the coater, and the deflector was removed. Valve 72 was energized; motor 80 was energized about 0.5 second later. The pigtail was pulled upwardly through the coater at a rate of about 48 inch (122 cm) per minute. Heat source 81 had previously been adjusted to provide an optimal cure temperature, i.e. its intensity was sufficient to cure the coating such that it properly adhered to the fiber, but it was not so hot that carbonation occurred. An overcoating of 900 μm was applied to the pigtail. Immediately before the pigtails were about to leave the friction blocks, valve 72 was de-energized. About 1.5 seconds later, after the valve had closed, motor 80 and source 81 were de-energized. About 6 inches (15 cm) at the end of the pigtail remained uncoated. The process was repeated to overcoat the remaining pigtails. The coating material provided the pigtails with excellent corrosion resistance and handleability, and it was colorable.

The two fibers at one end of the coupler were threaded through a boot formed of polyvinyl chloride, and thin region 84 was pulled over the end of the coupler until surface 92 abutted against the end of the coupler as shown in FIG. 15. The process was repeated at the opposite end of the coupler. A stainless steel sleeve was slipped over the coupler, and the ends of the sleeve were crimped.

This process was routinely used to make 3 dB couplers. Couplers made by a previous process were used as a basis of comparison. The previous process employed fiber pigtails comprising 125 μm single-mode fibers, the coatings of which had a diameter of 250 μm. The thicker coatings necessitated the use of capillary tubes having apertures, the cross-sectional dimensions of which were larger than those of tubes employed in the above example. Both types of couplers were tested by injecting light into one pigtail and measuring the power emanating from both pigtails at the opposite end of the coupler. A comparison of the total output power to the input power gave the insertion loss. A process has good repeatability when it consistently produces couplers having the desired signal split. The process of the present invention had a better repeatability, and it resulted in the production of couplers having lower median excess loss as compared with said previous process.

FIG. 17 shows an integrated optical circuit of the type disclosed on U.S. Pat. No. 4,765,702. Buried within the surface of glass substrate 100 are optical paths 101 and 102 which have been formed by ion diffusion techniques. Paths 101 and 102 extend sufficiently close to one another for a sufficient distance to effect the coupling of energy therebetween. Beyond the coupling region, the two paths begin to become more separated and eventually terminate at V-grooves 103. Optical fibers 106 are affixed to grooves 103 with the cores thereof in abutment with the substrate at the end of the grooves. The fiber cores are aligned with the ends of the optical paths. Fibers 106 are short lengths which constitute pigtails that are to be connected to fibers of a system in which the optical circuit is to be employed. Each pigtail is therefore provided with a coating, the diameter of which is compatible with the system fiber coatings. Before a fiber is inserted into a groove, the coating is stripped from the end thereof for a short distance, conventionally a distance of about 1.0 cm. Heretofore, if the coating diameter were 900 μm, for example, the minimum spacing $S_{min}$ between grooves 103 would also be about 900 μm.

If the bending radius of the optical paths is greater than a maximum permissible bend radius, a bending loss occurs. In order to achieve the necessary separation between optical paths to connect pigtails thereto (900 μm in the above example) some minimum length $L_{min}$ is required between the end of the coupling region and the edge of the substrate, if the maximum permissible bend radius is not to be exceeded. If the spacing $S_{min}$ must be made large to accommodate thick fiber coatings, then the length $L_{min}$ is also relatively large, and the substrate size is large.

The size of integrated optical circuits requiring relatively thick pigtail coatings can be minimized by initially connecting to the circuit a thinly coated pigtail and thereafter adding an overcoat as described above. Each fiber 106 is therefore initially provided with a coating 107 that is sufficiently thin that the fibers can be affixed to V-grooves that are spaced a distance less than the spacing $S_{min}$ that would have been required by the thickness of coating 109. After the fibers are attached to the circuit, they are provided with overcoating 109. The distance between the fiber endface and the point along the fiber at which the overcoat is applied is sufficiently great that the fibers can bend away from each other to accommodate the thicker overcoat. The region between the substrate and the overcoated portions of the pigtails can be provided with a boot as described above.

We claim:

1. An optical fiber coupler comprising an elongated glass body having a solid midregion and first and second opposite end portions which respectively extend from said midregion to the first and second ends of said body, the central portion of said midregion having a diameter smaller than the diameter of the remainder of said glass body, first and second longitudinal apertures respectively extending from said first and second ends of said body to the midregion thereof, at least two glass glass optical fibers, each having a core and cladding, extending through said body and beyond at least the first end thereof, the cores of said optical fibers being closer together in the central portion of said midregion than in the remainder of said glass body so that optical signals can be coupled from one of said cores to another of said cores, a preliminary coating of ultraviolet light curable coating material on the surface of those portions of said at least two glass optical fibers that extend from said first end, and an overcoat of heat curable coating material applied over said preliminary coating.

2. An optical fiber coupler in accordance with claim 1 wherein said preliminary coating extends into said first longitudinal aperture, and said overcoat does not extend into said longitudinal aperture.

3. An optical fiber coupler in accordance with claim 1 wherein said preliminary coating extends into said first longitudinal aperture, and wherein the space between said aperture and said preliminary coating is filled with bonding material.

4. An optical fiber coupler in accordance with claim 3 wherein said overcoat contacts said bonding material.

5. An optical fiber coupler in accordance with claim 3 wherein said overcoat is separated from said bonding material, said coupler further comprising boot means between said first end of said body and said overcoat.

6. An optical fiber coupler in accordance with claim 5 wherein said boot means comprises a tapered sleeve of resilient material, said coupler further comprising means securing said boot to said coupler.

7. An optical fiber coupler in accordance with claim 5 wherein said boot means comprises a tapered sleeve of resilient material, said boot having rigidifying means at the large diameter end thereof, said coupler further comprising a protective sleeve surrounding said glass body, an end of said protective sleeve being bent inwardly and engaging that portion of said boot having said rigidifying means.

* * * * *